United States Patent [19]

Isalski et al.

[11] 4,312,851
[45] Jan. 26, 1982

[54] TREATMENT OF AMMONIA SYNTHESIS PURGE GAS

[76] Inventors: Wieslaw H. Isalski, 29 Grosvenor Rd., Sale, Cheshire, England; Terence R. Tomlinson, 31 Bickerton Dr., Hazel Grove, Stockport, England

[21] Appl. No.: 83,827

[22] Filed: Oct. 11, 1979

[30] Foreign Application Priority Data

Nov. 17, 1978 [GB] United Kingdom ............... 44890/78

[51] Int. Cl.³ .............................................. C01C 1/04
[52] U.S. Cl. ....................................... 423/359; 55/23; 55/25; 55/57; 55/66; 55/267; 422/148
[58] Field of Search .................... 55/23, 25, 57, 66, 68, 55/70, 267, 268; 62/11; 423/359; 422/148

[56] References Cited
U.S. PATENT DOCUMENTS 1,849,357  3/1932  Pyzel ................................. 423/359
3,615,200 10/1971  Konoki ............................... 423/359
4,058,589 11/1977  Haslam .............................. 423/359

FOREIGN PATENT DOCUMENTS 1114407  5/1968  United Kingdom .
1183304  3/1970  United Kingdom .
1274504  5/1972  United Kingdom .
1460681  1/1977  United Kingdom .

Primary Examiner—O. R. Vertiz
Assistant Examiner—Wayne A. Langel
Attorney, Agent, or Firm—Browdy and Neimark

[57] ABSTRACT

A method of synthesizing ammonia by reacting a synthesis gas comprising nitrogen and hydrogen at superatmospheric pressure in a synthesis reaction zone with recycling of unreacting gas to the reacting zone is disclosed in which a purge gas stream is withdrawn at superatmospheric pressure and subjected to the steps of: (a) work expansion, (b) separation of methane and argon to form a gaseous product stream comprising nitrogen and hydrogen, (c) recompression of at least a portion of the gaseous product stream from step (b) using work generated in step (a), and (d) recycling of at least a portion of the recompressed product from step (c) to the reaction zone.

Apparatus for effecting said process is also claimed.

7 Claims, 2 Drawing Figures

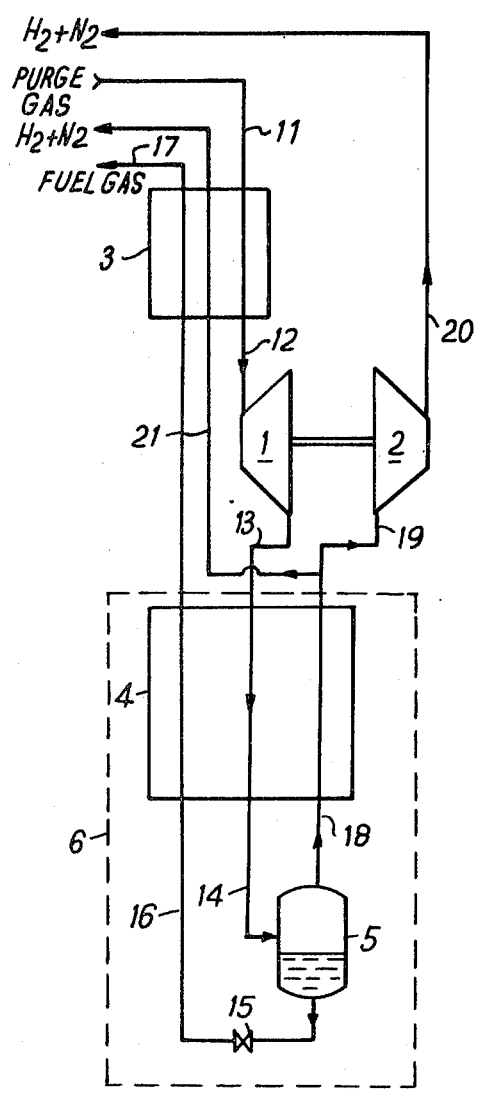
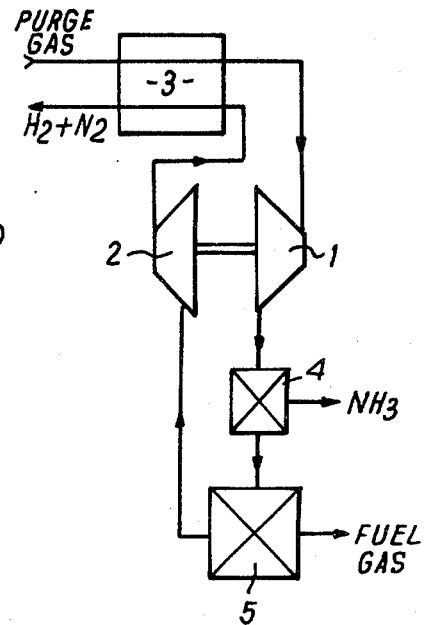

TREATMENT OF AMMONIA SYNTHESIS PURGE GAS

This invention relates to a process for synthesising ammonia.

In a widely practised process, ammonia is synthesised at superatmospheric pressure from a synthesis gas comprising hydrogen and nitrogen ideally in a ratio of 3 parts hydrogen to 1 part nitrogen by volume. However, in commercial processes, the ammonia synthesis gas also generally contains methane (about 1 mole %) introduced with the hydrogen, and argon (about 0.3 mole %) introduced with the nitrogen.

The methane and argon take no part in the ammonia synthesis and are therefore removed along with the unreacted hydrogen and nitrogen from the ammonia product which condenses out. To improve the efficiency of the process, the gas stream containing the unreacted nitrogen and hydrogen, and also containing the methane and argon impurities, is recycled to the ammonia synthesis reaction zone where it mixes with fresh nitrogen and hydrogen containing fresh amounts of these impurities, and thus these impurities tend to accumulate in the reaction zone as time proceeds, thereby lowering the partial pressure of the reacting mixture and hence reducing ammonia yield. Action therefore has to be taken to prevent the concentration of these impurities in the reactor exceeding an acceptable level.

To this end, it is general practice to withdraw continuously from the recycling gas stream a purge gas stream which is at superatmospheric pressure and which generally will have a combined content of 10 to 17% of argon and methane. The major components of this purge gas stream, which will have the same constitution as the recycling gas stream, are of course hydrogen and nitrogen of which the hydrogen is the more valuable.

Processes have been developed for recovering from the purge gas the bulk of the hydrogen, which may either be returned to the synthesis reaction zone or used for other purposes. In the former case, with which this invention is particularly concerned, it is advantageous to recover a part of the nitrogen together with the hydrogen, so that both may be re-used in the ammonia synthesis reactor.

The hydrogen-nitrogen mixture is normally recovered by cooling the purge gas at an elevated pressure to a temperature which is low enough to condense almost all the methane and argon with at least a part of the nitrogen, the hydrogen with some nitrogen remaining in the gaseous phase. In current practice it is found advantageous to recover a product consisting of approximately 90% hydrogen, 9% nitrogen and about 1% of a mixture of methane and argon.

The purge gas is usually withdrawn from the synthesis reaction zone after the bulk of the ammonia has been removed by condensation. It is therefore generally available at synthesis pressure, which may vary from about 140 to 130 bar, and at approximately $-20°$ C. However, some ammonia plants include a cold recovery system, so in such cases the purge gas may be withdrawn at or above ambient temperature. The purge gas normally contains about 2% of ammonia and has the following approximate composition:

|  | Mole % |
|---|---|
| $H_2$ | 62 |
| $N_2$ | 20 |
| A | 5 |
| $CH_4$ | 11 |
| $NH_3$ | 2 |

The amount of purge gas withdrawn is generally about 8% of the flow of fresh synthesis gas to the reactor. Thus, for example, in a plant producing 1000 short tons per day of ammonia, approximately 300,000 cubic feet per hour of purge gas containing about 186,000 cubic feet of hydrogen are removed.

The recovery of the hydrogen-nitrogen mixture from the purge gas is preferably carried out at pressures between 50 and 80 bar and it is necessary to remove residual ammonia before the gas is further cooled in the separation unit, as it would otherwise solidify and block the equipment.

A favoured procedure is to recover the ammonia in an aqueous solution by scrubbing the purge gas with water or with a lean ammonia solution, after which it can, if desired, be converted to liquid anhydrous ammonia by distillation. The ammonia-free purge gas is then dried by adsorption before entry into the cold box for further cooling and hydrogen separation. The scrubbing and drying operations are generally carried out after the purge gas has been expanded from the 140–300 bar obtaining in the synthesis loop to the 50–80 bar at which the separation unit is operated.

Recycling the hydrogen-nitrogen mixture from the purge gas separation plant to the synthesis loop may serve to increase the amount of ammonia produced from a given flow of feedstock and fuel or to reduce the amount of feedstock required to deliver a given quantity of ammonia. Which alternative is chosen depends partly on the requirements of the operator and partly on the flexibility of the available equipment, in particular when a hydrogen recovery unit is to be added to an existing ammonia plant. In such circumstances a constraint is frequently imposed by the limited capacity of the synthesis gas compressor, which compresses the synthesis gas from the pressure of the steam reformer, which may be about 25–30 bar, to the synthesis pressure of 140–300 bar. Since the purge gas separation unit delivers the recovered hydrogen-nitrogen product at only 50–80 bar, this product has to be re-compressed to synthesis pressure and therefore has to be fed to an intermediate stage of the synthesis gas compressor. (The synthesis gas compressor is generally a multistage centrifugal machine). This means that, first, the purge gas separation unit has to be operated at a pressure compatible with an available interstage pressure of the synthesis gas compressor and, secondly, the capacity of this and any subsequent stages of the synthesis gas compressor must be adequate to accommodate the additional flow of gas. This is by no means always the case and it may therefore be necessary to install additional compressor equipment to bring the recovered hydrogen-nitrogen product from the separation unit up to synthesis pressure. The resulting additional capital and utility costs may outweigh the advantages of recovering and recycling the hydrogen.

We have now developed a process whereby a major portion of the hydrogen-nitrogen mixture recovered from a purge gas stream from an ammonia synthesis reaction may be recycled to the reaction zone at synthesis pressure without the need for any substantial increase in power consumption. In addition, the need for external refrigeration in the purge gas separation unit may be eliminated.

According to the present invention there is provided a method of synthesising ammonia by reacting a synthesis gas comprising nitrogen and hydrogen at superatmospheric pressure in a synthesis reaction zone with recycling of unreacting gas to the reaction zone and wherein a purge gas stream is withdrawn at superatmospheric pressure and subjected to the steps of:

(a) work expanding said purge gas stream, (b) separating methane and argon from the work expanded purge gas stream to form a gaseous product stream comprising nitrogen and hydrogen, (c) recompressing at least a portion of the gaseous product stream from step (b) using work generated in step (a), and (d) recycling at least a portion of the recompressed product from step (c) to the reaction zone.

Although the particular manner in which methane and argon are separated in step (b) is not of paramount importance, generally the work expanded stream (which will have undergone a certain degree of cooling in the work expansion step) is cooled further to a subambient temperature at which substantially all of the methane and argon contained in the stream and a portion of the nitrogen condense, the liquid and vapour components of the cooled stream are phase separated and the vapour component (which will consist essentially of hydrogen and nitrogen) is subjected to recompression in step (c).

Conveniently, the work expanded stream is cooled by heat exchange with at least one and preferably both of the liquid and vapour components from the phase separation, the former preferably being expanded prior to being heated in heat exchange with the work expanded purge gas stream.

Preferably the work expansion step (a) and the recompression step (c) are carried out respectively in an expander and a compressor which are mechanically coupled to run at the same speed, for example by being mounted on the same shaft.

The invention further provides apparatus for the treatment of ammonia synthesis purge gas comprising expansion means in which purge gas stream at high pressure may be expanded with the performance of work, means for separating methane and argon contained in the expanded purge gas stream to form a stream enriched in hydrogen and nitrogen and compression means for compressing said enriched stream to synthesis pressure, said compression means and said expansion means being coupled so that work generated in said expansion means is utilised in said compression means to compress the enriched stream.

It will be appreciated that in accordance with the invention the pressure differential between the synthesis loop and the separation unit is utilised at least in part to recompress the hydrogen-nitrogen mixture back to synthesis pressure. The whole or a major part of the recovered hydrogen-nitrogen mixture can therefore be delivered to the synthesis loop at synthesis pressure without any significant additional consumption of power (although additional power input may be utilised if desired). Additionally use of the invention enables the need for external refrigeration in the unit in which separation of argon and methane occurs to be reduced or eliminated.

The operation of the process of the invention is generally facilitated by the fact that the product flow from the separation unit is always significantly smaller than the flow of purge gas, since the methane and argon and a part of the nitrogen will have been removed.

Nevertheless, with the efficiencies of presently available machines, it is not always possible to recompress the whole of the product to full synthesis pressure with the power developed by the expander in step (a) and the proportion which can be recompressed generally depends on a number of factors of which the temperature ranges through which the apparatus in which steps (a) and (c) are operated is the most important. Other factors are the desired degree of hydrogen recovery, the hydrogen concentration of the separated gaseous product and the composition of the purge gas itself.

A number of modes of operation, representing distinct embodiments of the invention are possible, according to the state of the purge gas treated in the separation unit. For example, if the purge gas is withdrawn from the synthesis loop after the bulk of the ammonia has been removed, the recovery of any residual ammonia may be carried out either before or after the purge gas has been expanded from synthesis pressure to separation pressure. In the former case it is advantageous to arrange for the gas to leave the expander at a low temperature, preferably around $-30°$ to $-40°$ C., since this simplifies the design and operation of the separation plant, eliminating the need for external refrigeration therein. Additionally in such cases it may be economically justified to compress only a major portion rather than the whole of the product to synthesis pressure, since the small residual protion can almost always be accommodated at an intermediate stage of the synthesis gas compressor.

Alternatively, if the purge gas is work-expanded to the operating pressure of the separation plant while still containing around 2% ammonia, this ammonia will have to be removed and preferably recovered before the gas is cooled to a low temperature. In such cases, it is advantageous for the purge gas prior to work-expansion to be at a relatively high temperature, so that the expanded gas will be available at around ambient temperature, suitable for scrubbing out the residual ammonia with water or with a dilute ammonia solution. In such cases the power generated by the expander is generally adequate to recompress the whole of the separation plant product to synthesis pressure. On the other hand, the separation plant itself may tend to become somewhat more complex and expensive and may require a small amount of external refrigeration at temperatures around $-40°$ C.

According to a further possibility, gas may be withdrawn from the synthesis loop, preferably at an elevated temperature, before the bulk of the ammonia has been removed from it. This procedure has the advantage that a larger stream is available for work-expansion, which would then be more than adequate to compress the separation plant product to synthesis pressure. However, in this method of operation the installation of a relatively large and expensive ammonia recovery system downstream of the expander in addition to that already included at a higher pressure in the synthesis loop itself is called for. This manner of operation will therefore generally only prove economical under exceptional circumstances, for instance when there is a requirement for some extra power over the above what is needed to re-compress the hydrogen-nitrogen product.

The invention will now further be described in more detail by way of example with particular reference to the accompanying drawings, of which FIG. 1 is a flow diagram illustrating the recycling process of one embodiment of the invention, and FIG. 2 is a flow diagram illustrating the recycling process of a second embodiment.

Referring to FIG. 1, numeral 1 denotes a turbo-expander and 2 its associated compressor, 3 and 4 are heat exchangers, 5 is a liquid-vapour separator and 6 is the cold box in which the cold portion of the equipment is installed.

Purge gas from which all the ammonia has been removed enters heat exchanger 3 through line 11 at 140 bar and 22° C. It leaves the exchanger through line 12 at approximately 5° C. and is expanded to 70 bar in the turbo-expander 1, which it leaves through line 13 at −35° C. It then enters the cold box 6 and is cooled further in exchanger 4, as a result of which most of the methane and argon and a part of the nitrogen are liquefied. The liquid-vapour mixture passes through line 14 to separator 5, from the bottom of which the liquid fraction is withdrawn and expanded to 3 bar in throttle valve 15. The liquid evaporates in exchanger 4 to which it passes through line 16. It is then warmed to near ambient temperature in exchanger 3, which it leaves for use, for example, as fuel gas through line 17.

The hydrogen-nitrogen product, containing 94% of the hydrogen in the purge gas, is warmed to −38° C. in exchanger 4, to which it passes through line 18. A major portion thereof, amounting to about 87%, passes through line 19 to the compressor 2, which delivers it at 140 bar through line 20 for return to the ammonia synthesis reactor. A small portion is returned through line 21 and exchanger 3 at 70 bar.

The advantages gained by this embodiment of the invention include the following:

(1) Approximately 87% of the recovered hydrogen-nitrogen mixture can be returned to the synthesis reaction zone at synthesis pressure without additional power consumption.

(2) No external refrigeration is required in the cold box.

(3) The cold box itself can be small and compact, first in view of (2) above, and secondly because it has to operate only from −40° C. downwards instead of from ambient temperature as has hitherto been customary.

The small flow of about 13% of the recovered hydrogen-nitrogen product which is not recompressed in compressor 2 can generally be accommodated within the existing main synthesis gas compressor.

Referring now to FIG. 2, this illustrates a further embodiment of the invention in which a purge gas containing, for example, 2% NH$_3$ is separated to recover ammonia as well as hydrogen-nitrogen mixture to be recycled to the synthesis loop. In FIG. 2, 1 and 2 represent respectively the expander and the compressor; 3 is a heat exchanger, 4 is an ammonia recovery unit and 5 is the cold box in which the hydrogen-nitrogen product is separated from the ammonia-free purge gas.

The purge gas, which is withdrawn from the synthesis loop at 50° C. and 140 bar, and has the following composition:

|  | M % |
|---|---|
| H$_2$ | 62 |
| N$_2$ | 20 |
| A | 5 |
| CH$_4$ | 11 |
| NH$_3$ | 2 |
|  | 100 | is heated in exchanger 3 from 50° to 76° C. and is then expanded in the turbine 1 from 140 to 70 bar. It leaves the turbine at 25° C., after which the ammonia is recovered by scrubbing with water and subsequent distillation in ammonia recovery unit 4. After drying by adsorption on molecular sieves it enters the cryogenic unit 5 at 20° C. and the hydrogen-nitrogen product and the fuel gas leaves at 17° C. At this temperature the product enters compressor 2, is re-compressed to 140 bar, and is delivered at 96° C. It is then cooled in exchanger 3 to 56° C. and returned to the synthesis loop.

In this example, in which the residual ammonia is recovered at 70 bar, after expansion in the turbine, the whole of the hydrogen-nitrogen product is recompressed to synthesis pressure without additional power consumption. On the other hand, the separation unit is slightly more complex than that of FIG. 1. With this installation, it is possible to recover 94% of the hydrogen in the purge gas, delivering a product containing 91% hydrogen at the synthesis pressure of 140 bar.

We claim:

1. A method of synthesising ammonia by reacting a synthesis gas comprising nitrogen and hydrogen at superatmospheric pressure in a synthesis reaction zone with recycling of unreacting gas to said synthesis reaction zone, wherein fresh synthesis gas is introduced as a feed stream to a synthesis loop comprising said synthesis reaction zone and a recycle path leading from an exit of the synthesis reaction zone to an inlet thereto, and wherein a purge gas stream comprising unreacted hydrogen and nitrogen and impurities including methane and argon is withdrawn at superatmospheric pressure from said synthesis loop and subjected to the following steps (a) to (d) carried out in the sequence stated:

(a) first work expanding said withdrawn purge gas stream to a second superatmospheric pressure lower than the pressure in said synthesis loop, (b) separating methane and argon from the work expanded purge gas stream to form a gaseous product stream comprising nitrogen and hydrogen, (c) recompressing at least a portion of said gaseous product stream from step (b) using work generated in step (a) and (d) recycling at least a portion of the recompressed product from step (c) to said synthesis reaction zone, whereby to recycle hydrogen and nitrogen values thereto.

2. A method according to claim 1 in which in step (b) the work expanded stream is cooled to a sub-ambient temperature at which substantially all of the methane and argon contained in the stream and a portion of the nitrogen condense, the liquid and vapour components of the cooled stream are phase separated and the vapour component is subjected to recompression in step (c).

3. A method according to claim 2 in which the work expanded stream is cooled by heat exchange with at least one of the liquid and vapour components from the phase separation.

4. A method according to claim 3 in which the liquid component from the phase separation is expanded prior to being heated in heat exchange with the work expanded purge gas stream.

5. A method according to claim 1 in which the work expansion step (a) and the recompression step (c) are carried out respectively in an expander and a compressor which are mechanically coupled to run at the same speed.

6. A method according to claim 5 in which the expander and compressor are mounted on the same shaft.

7. Apparatus for synthesising ammonia from a synthesis gas comprising nitrogen and hydrogen, said apparatus comprising a synthesis loop including a synthesis reaction zone and recycle conduit means leading from an exit of the synthesis reaction zone to an inlet thereto, first conduit means for introducing fresh synthesis gas to said synthesis loop, outlet means leading from said synthesis loop for withdrawal of a purge gas stream and means for treatment of said purge gas stream comprising expansion means in which purge gas at high pressure directly from said synthesis loop may be expanded with the performance of work and including an outlet for delivery of said purge gas stream after expansion, separation means for separating methane and argon contained in the expanded purge gas stream to form a stream enriched in hydrogen and nitrogen, second conduit means extending from the outlet of said expansion means to said separation means for transferring the expanded purge gas stream to said separation means, third conduit means extending from the outlet of said separation means to said compression means and fourth conduit means extending from an outlet of said compression means and connected to enable hydrogen and nitrogen values of said enriched stream to be recycled to the synthesis reaction zone, said compression means and said expansion means being coupled so that work generated in said expansion means is utilised in said compression means to compress the enriched stream.

* * * * *